United States Patent
Bozoian

[15] 3,639,896
[45] Feb. 1, 1972

[54] VEHICLE SPEED RESPONSIVE WARNING ACTUATING SYSTEM

[72] Inventor: Michael Bozoian, Ann Arbor, Mich.
[73] Assignee: Ford Motor Company, Dearborn, Mich.
[22] Filed: May 4, 1970
[21] Appl. No.: 34,266

[52] U.S. Cl. ............................................340/62, 340/263
[51] Int. Cl. ..........................................................B60q 1/00
[58] Field of Search....................340/52, 53, 62, 263, 264; 180/82.1

[56] References Cited

UNITED STATES PATENTS 3,203,501  8/1965  Carter et al.........................340/53 X
3,229,249  1/1966  Brenner..............................340/62 X

*Primary Examiner*—Alvin H. Waring
*Attorney*—John R. Faulkner and Glenn S. Arendsen

[57] ABSTRACT

Electronic control circuitry responds to vehicle speed to actuate sequentially a plurality of warning lamps when vehicle speed reaches predetermined values. Actuation of each warning lamp automatically extinguishes its preceding lamp. Other devices also can be operated by the system, which attains extremely high accuracy from conventional electrical components.

6 Claims, 2 Drawing Figures

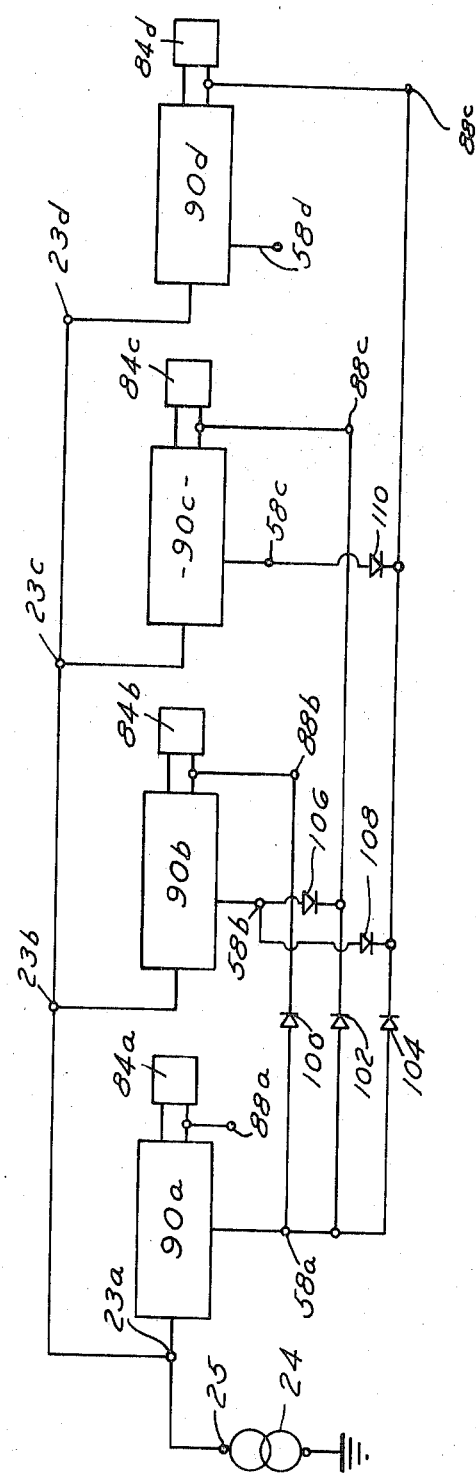

VEHICLE SPEED RESPONSIVE WARNING ACTUATING SYSTEM

BACKGROUND OF THE INVENTION

A lamp that is illuminated when vehicle speed passes some predetermined point has been used in certain vehicles as a warning device. The lamp typically was controlled by a switch actuated by a speedometer pointer when the pointer passed the predetermined speed indication. Modern vehicles also include numerous devices of a more substantial nature that respond to predetermined values of vehicle speed. Typical of such devices are ignition timing control equipment, throttle blade control equipment and devices that lock the vehicle doors above a predetermined vehicle speed.

The speedometer of vehicles equipped with a switch controlled warning lamp generally becomes highly inaccurate at speeds above the actuation point. Other vehicle equipment typically obtains its actuating signal from the intake manifold pressure of the vehicle engine which is only roughly proportional to vehicle speed. Electronic systems have been proposed recently for controlling the more substantial items of vehicle equipment. Such systems have an accuracy much higher than engine manifold pressure sensing devices, but usually require some precision components to satisfy the accuracy requirements of speed indicating and warning mechanisms. In addition, a single system capable of accurately controlling several items of vehicle equipment has not been available.

This invention provides an electronic system capable of actuating a plurality of vehicle devices as highly accurate functions of vehicle speed. The system can actuate such devices sequentially, i.e., actuation of a second device can deactivate an earlier device. In the system, an electric, signal generator is driven mechanically at a speed representative of vehicle speed by one of the vehicle wheels. A first electronic control circuit is coupled to the vehicle energy source and the signal generator to actuate a first device energy source and the signal generator to actuate a first device when vehicle speed reaches a first predetermined value. A second electronic control circuit also coupled to the energy source and the signal generator actuates a second device when vehicle speed reaches a higher predetermined value. Electronic elements couple the first control circuit to the second control circuit for deactivating the first device when the second device is activated.

The system can be built with electrical components having typical tolerances but nevertheless produces speed indication and response within an accuracy of less than 1 percent over a relatively wide range of source voltages and vehicle speeds. A small alternator connected to one of the vehicle wheels can be used as the signal generator. A highly useful alternator comprises a permanent magnet rotor mounted inside an annular bobbin containing a stator winding as described in U.S. Pat. application Ser. No. 853,905 filed Aug. 28, 1969 now U.S. Pat. No. 3,592,171, the entire disclosure of which is incorporated herein by this reference.

BRIEF DESCRIPTION OF THE DRAWINGS

FIG. 2 is a schematic of the overall system of this invention showing connections between the various control circuits in a manner providing sequential actuation of the devices operated by each circuit.

DETAILED DESCRIPTION

Figure 1:
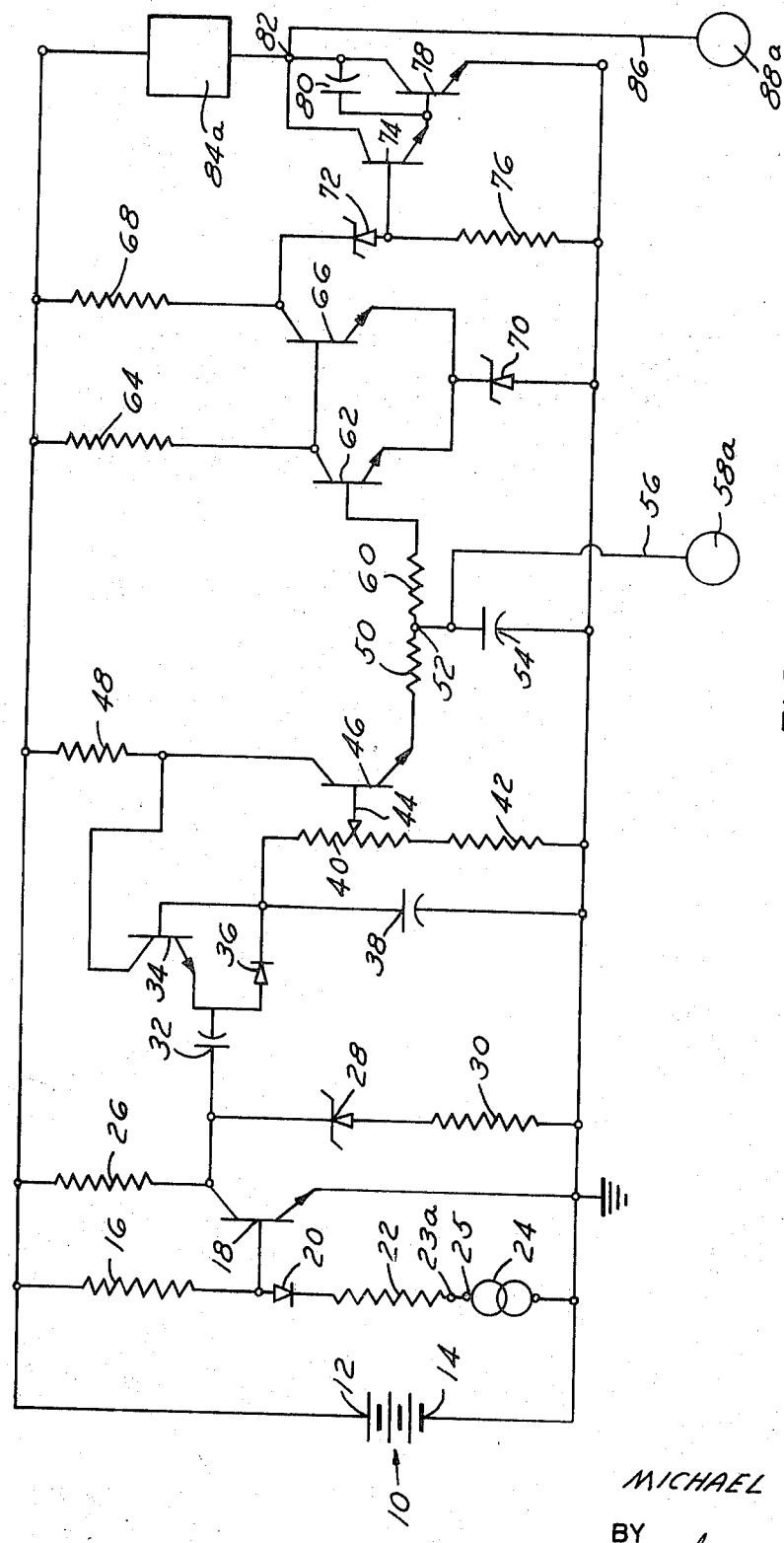
FIG. 1 is a schematic diagram of one of the control circuits used in the system of this invention. It shows the relationship of a signal generator to a device that is actuated at a predetermined vehicle speed.

Referring to FIG. 1, a vehicle battery 10 has a positive terminal 12 and a negative terminal 14 connected to ground. Battery 10 is supplied by a conventional vehicle alternator (not shown) and supplies energy to the other vehicle electrical systems (not shown).

Each control circuit in the system of this invention includes a charging circuit that charges a capacitor to a voltage level representative of engine speed and a switching circuit that responds to predetermined values of the voltage level. The charging circuit comprises a resistor 16 that connects positive terminal 12 to the base of an NPN-transistor 18. A diode 20 has its anode connected to the base of transistor 18 and its cathode connected through a resistor 22 to an input terminal 23a. A small alternator 24 driven mechanically by a vehicle wheel (not shown) has one output terminal connected to ground and the other output terminal 25 connected to terminal 23a.

A resistor 26 connects positive terminal 12 with the collector of transistor 18, and the emitter of transistor 18 is connected to negative terminal 14. A voltage reference diode 28 has its cathode connected to the collector of transistor 18 and its anode connected through a resistor 30 to ground. The collector of transistor 18 also is connected through a capacitor 32 to the emitter of an NPN-transistor 34. A diode 36 has its anode connected to the emitter of transistor 34 and its cathode connected to the base thereof. A capacitor 38 connects the base of transistor 34 to negative terminal 14. Also connecting the base of transistor 34 to negative terminal 14 in parallel with capacitor 38 is a pair of series connected resistors 40 and 42.

Resistor 40 has a movable tap 44 that is connected to the base of an NPN-transistor 46. The collector of transistor 46 is connected to the collector of transistor 34 and a resistor 48 connects both collectors to positive terminal 12.

A resistor 50 connects the emitter of transistor 46 to a terminal 52. Terminal 52 is connected to ground by a capacitor 54. A lead 56 connects terminal 52 to an external terminal 58a and a resistor 60 connects terminal 52 to the base of an NPN-transistor 62.

The base of transistor 62 is the input of the switching circuit. The collector of transistor 62 is connected to positive terminal 12 by resistor 64 and is connected directly to the base of an NPN-transistor 66. A resistor 68 connects the collector of transistor 66 to positive terminal 12. Both emitters of transistors 62 and 66 are connected to the cathode of a voltage reference diode 70 that has its anode connected to ground.

Another voltage reference diode 72 has its cathode connected to the collector of transistor 66 and its anode connected to the base of an NPN-transistor 74. A resistor 76 connects the base of transistor 74 to ground. The emitter of transistor 74 is connected to the base of an NPN-type power transistor 78 that has its emitter connected directly to ground. A capacitor 80 connects the base and collector of power transistor 78. Both collectors of transistors 74 and 78 are connected to a sense terminal 82 that is connected through the actuating terminal of a device 84a to positive terminal 12. Sense terminal 82 thus is connected to the positive main terminal of power transistor 78 and is between transistor 78 and device 84a. A lead 86 connects terminal 82 to an external terminal 88a.

Referring to FIG. 2, box 90a represents the entire control circuit of FIG. 1 except for alternator 24 and device 84a. Similar control circuits are represented by boxes 90b, 90c and 90d. Each of circuits 90b, 90c and 90d is connected to a device actuated thereby as represented respectively by boxes 84b, 84c and 84d. Terminal 25 of the alternator is connected to each input terminal 23a, 23b, 23c and 23d of respective circuits 90a, 90b, 90c and 90d.

The anode of a diode 100 is connected to terminal 58a of circuit 90a and its cathode is connected to sense terminal 88b of circuit 90b. A diode 102 has its anode connected to terminal 58a and its cathode connected to sense terminal 88c of circuit 90c while a diode 104 has its anode connected to terminal 58a and its cathode connected to sense terminal 88d of circuit 90d.

A diode 106 has its anode connected to terminal 58b of circuit 90b and its cathode connected to sense terminal 88c of circuit 90c. A diode 108 has its anode connected to 58b and its cathode connected to sense terminal 88d of circuit 90d. A diode 110 has its anode connected to terminal 58c of circuit 90c and its cathode connected to sense terminal 88d. Terminals 88a and 58d are floating and can be eliminated if desired.

Typical values and types of components useful in the system are: resistor 16, 47K ohms; diodes 20 and 36, 1N4001; resistor 22, 820 ohms; resistor 26, 1,000 ohms; diodes 28 and 72, 1N4738; resistor 30, 33 ohms; capacitor 32, 0.005 microfarads; capacitors 38 and 54, 1 microfarad; resistor 40, 25K ohms; resistor 48, 270 ohms; resistors 50, 60, 64 and 66, 2.2K ohms; diode 70, 1N4733; resistor 76, 6.8K ohms; capacitor 80, 0.02 microfarads; transistors 18, 34, 46, 62, 66 and 74, 2N3904; and transistor 78, 2N5294.

When the vehicle containing the system is at rest and no signal is applied to terminals 23 by alternator 24, transistor 18 is biased into a conducting condition. Transistor 34 is not conducting and both plates of capacitor 38 are at ground potential. Transistor 46 is connected in an emitter follower configuration and it also is nonconducting so that no potential is applied to the base of transistor 62. Transistor 62 thus is not conducting while transistor 66 is conducting. Transistors 74 and 78 are nonconducting. Terminals 58 are at a lower potential than terminals 88, so diodes 100–110 are in nonconducting states.

When the vehicle begins moving, each negative portion of the AC signal produced at terminal 25 by alternator 24 reduces the voltage on the base of transistor 18 to switch it into nonconduction. An alternating signal thus appears at the collector of transistor 18. Transistor 34 reacts to each pulse to produce a unit charge on capacitor 38, which through the action of resistors 40 and 42 attains a charge that is proportional to the frequency of the alternating waveform produced by alternator 24.

Transistor 46 is biased into conduction by the charge on capacitor 38 when the charge exceeds a value predetermined by variable resistor 40. The DC voltage resulting at the emitter of transistor 46 typically has a slight AC ripple which is filtered by the combined action of resistors 50 and 60 and capacitor 54. Terminal 58 rises toward supply voltage whenever transistor 46 is conducting.

Transistor 62 also begins conducting and its conduction reduces the voltage at the base of transistor 66 which switches transistor 66 into a nonconducting state. Voltage reference diode 70 combines with the action of transistors 62 and 66 to provide highly accurate switching operation despite the use of unmatched commercial tolerance components. With the components listed above, transistors 66 switches with an accuracy of less than plus or minus 1 m.p.h. When transistor 66 turns off, diode 72 applies a portion of the voltage appearing at the collector of transistor 66 to the base of transistor 74. Transistor 74 turns on to switch power transistor 78 into its conducting state, thereby actuating device 84a. Note that when device 84a is unactuated, sense terminal 88a is substantially at full battery potential. The terminal 88a drops almost to ground potential when the device is actuated, however, and thus exhibits or senses the condition of the device.

Sequential or cascading operation of a plurality of devices 84a—d occurs in the following manner. Devices 84a—d can be speed warning lights that are illuminated at speeds of 50, 60, 70 and 80 m.p.h. respectively. When vehicle speed reaches 50 m.p.h., warning light 84a is illuminated by the operation of its circuit 90a. Circuits 90b, 90c, and 90d are set to actuate the respective lights at the predetermined higher vehicle speeds by appropriate selection of capacitor 38 and/or resistors 40 and 42. Variable resistor 40 permits adjustment of the switching points and can be replaced by a constant resistor if such adjustment is unnecessary.

When vehicle speed reaches 60 m.p.h., circuit 90b operates in the manner described above to actuate warning light 84b. Since sense terminal 88b then drops substantially to ground potential, diode 100 is forward biased which clamps terminal 52 of circuit 90a substantially to ground. Transistor 62 of circuit 90a then turns off, thereby deactivating warning light 84a.

When vehicle speed reaches 70 m.p.h., circuit 90c actuates warning light 84c, diode 106 deactivates light 84b and diode 102 holds light 84a in its deactivated state. Similar operation occurs when a vehicle speed of 80 m.p.h. actuates light 84d and diodes 104, 108, and 110 deactivate lights 84a, 84b and 84c.

Voltage reference diode 28 and resistor 30 prevent switching point variations over a wide range of source voltages. Diode 28 by itself is capable of clipping the waveforms applied to capacitor 32, and subsequently to capacitor 38, to eliminate the effect on the capacitors of varying source voltages. The remainder of the circuit, however, switches at lower points with increasing source voltages and can introduce errors of 5–10 percent with source variations of 10–20 volts. Errors of that magnitude are intolerable since the vehicle driver can compare readily light actuation with speedometer indications. Resistor 30 is selected so voltage clipping takes place with a slightly positive voltage coefficient to compensate for the negative coefficient of the remainder of the circuit. Overall switching accuracy of less than 1 percent over the anticipated range of source voltages is achieved without expensive voltage regulators. Diode 70 provides stable voltage level detection and narrow hysteresis in the switching circuit (transistors 62 and 66).

Actuating speeds can be modified as desired, and various devices can be substituted for some or all warning lamps. A slight delay in switching action of the circuits can be achieved by increasing the capacitance of capacitor 54. Such delay is useful in preventing rapid, oscillatory switching when vehicle speed is hovering at a switching value.

Thus this invention provides an accurate, sequential speed indicating system suitable for use over the anticipated range of vehicle source voltages. An unlimited number of devices can be actuated sequentially by the system. Sequential actuation is achieved through the use of conventional diodes that connect the switch circuit input terminals of each control circuit with sense terminals of each succeeding control circuit.

I claim:

1. An electronic system for actuating a plurality of devices on a vehicle as functions of vehicle speed comprising
   a source of electrical energy,
   an electrical signal generator driven rotatably at a speed representative of vehicle speed,
   first control circuit means coupled to the energy source and the signal generator for actuating a first device when vehicle speed reaches a first predetermined value,
   second control circuit means coupled to the energy source and the signal generator for actuating a second device when vehicle speed reaches a higher predetermined value, and
   means coupling the first control circuit means to the second control circuit means for deactuating the first device when the second device is actuated.

2. The system of claim 1 in which each control circuit means comprises a charging circuit for charging a capacitor to a voltage level representative of engine speed and a switching circuit for actuating one of said devices when the voltage level reaches a predetermined value.

3. The system of claim 2 in which the switching circuit decreases its switching level with increasing voltage of said source of electrical energy, and the charging circuit comprises a voltage reference diode in series with a resistor for increasing the voltage level on the capacitor to compensate for the decrease.

4. The system of claim 3 in which the means coupling the first and second control circuit means is a diode that becomes forward biased to deactuate the first device when the second control circuit means is actuated.

5. The system of claim 4 in which the diode connects the input of the switching circuit of the first control circuit means to a sense terminal in the second control circuit means that approaches ground potential when the second device is actuated.

6. The system of claim 1 in which the means coupling the first and second control circuit means is a diode that becomes forward biased to deactuate the first device when the second control circuit means is actuated.

* * * * *